United States Patent
Kwan et al.

(10) Patent No.: US 9,940,520 B2
(45) Date of Patent: Apr. 10, 2018

(54) AUTOMATIC TARGET RECOGNITION SYSTEM WITH ONLINE MACHINE LEARNING CAPABILITY

(71) Applicant: Applied Research LLC., Rockville, MD (US)

(72) Inventors: Chiman Kwan, Rockville, MD (US); Bulent Ayhan, Bethesda, MD (US)

(73) Assignee: APPLIED RESEARCH LLC., Rockville, MD (US)

( * ) Notice: Subject to any disclaimer, the term of this patent is extended or adjusted under 35 U.S.C. 154(b) by 145 days.

(21) Appl. No.: 15/087,235

(22) Filed: Mar. 31, 2016

(65) Prior Publication Data
US 2016/0328838 A1    Nov. 10, 2016

Related U.S. Application Data

(60) Provisional application No. 62/155,748, filed on May 1, 2015.

(51) Int. Cl.
*G06K 9/00* (2006.01)
*G06K 9/46* (2006.01)

(52) U.S. Cl.
CPC ... *G06K 9/0063* (2013.01); *G06K 2009/4657* (2013.01); *G06K 2009/4695* (2013.01)

(58) Field of Classification Search
CPC ......... G06K 9/0063; G06K 2009/4657; G06K 2009/4695
See application file for complete search history.

(56) References Cited

U.S. PATENT DOCUMENTS

| 6,122,051 A | * | 9/2000 | Ansley | ..................... G01J 3/02 250/339.05 |
| 6,347,762 B1 | * | 2/2002 | Sims | ..................... F41G 7/2226 244/3.1 |
| 2010/0322480 A1 | * | 12/2010 | Banerjee | .............. G06K 9/2018 382/103 |

OTHER PUBLICATIONS

Geoffrey E. Hinton, Simon Osindero and Yee-Whye Teh, "A fast learning algorithm for deep belief nets", 2006, to appear in Neural Computation.
Adrian V. Mariano and John M. Grossmann, "Hyperspectral material identification on radiance data using single atmosphere or multiple-atmosphere modeling", Nov. 23, 2010, vol. 4, 043563, Journal of Applied Remote Sensing.
Jin Zhou, Bulent Ayhan, Chiman Kwan and Michael Eismann, "New and Fast Algorithms for Anomaly and Change Detection in Hyperspectral Images", Sep. 22, 2015, Rockville, MD, USA.

* cited by examiner

*Primary Examiner* — Shefali Goradia
(74) *Attorney, Agent, or Firm* — WPAT, PC

(57) ABSTRACT

A method and apparatus for real-time target recognition within a multispectral image includes generating radiance signatures from reflectance signatures, sensor information and environment information and detecting targets in the multispectral image with a sparsity-driven target recognition algorithm utilizing set of parameters tuned with a deep neural network.

16 Claims, 9 Drawing Sheets

AUTOMATIC TARGET RECOGNITION SYSTEM WITH ONLINE MACHINE LEARNING CAPABILITY

CROSS-REFERENCE TO RELATED APPLICATIONS

This application claims priority to U.S. Provisional Patent Application No. 62/155,748 filed on May 1, 2015, the entire content of which is incorporated herein by reference.

BACKGROUND OF THE INVENTION

The invention generally relates to the process of automatic target detection (ATR) within a multispectral or hyperspectral image. Multispectral and hyperspectral images record electromagnetic radiation of various wavelengths hitting each pixel of the image, and are commonly used for detection of objects of interest. Multispectral and hyperspectral remote sensing is particularly well suited to detection of areas of interest on the Earth from satellite or aircraft images, such as search and rescue operations, surveillance, detection of mineral deposits, or areas of ecological harm.

Multispectral and hyperspectral sensors generally collect information as a set of images, where each image is a two-dimensional array of pixels. Each pixel represents received electromagnetic energy in a range of wavelengths of the electromagnetic spectrum. Given the amount of information conveyed in each pixel, it is possible to identify objects even if the objects are captured in only a few pixels.

Various algorithms exist to classify multispectral and hyperspectral pixels as part of a target for ATR, however, conventional ATR for multispectral and hyperspectral images works in the reflectance domain where atmospheric compensation is applied to every pixel in the raw hyperspectral image. This is extremely time consuming and is not suitable for real-time operations.

Thus, there exists a need for an ATR system that improves upon the time-consuming aspects of conventional ATR to enable real-time target detection.

BRIEF SUMMARY OF THE INVENTION

The present invention is a method and apparatus for real-time target recognition within a multispectral or hyperspectral image. The method generates radiance signatures from reflectance signatures using a modeling approach that takes into account sensor information and environment information, and then detects targets in the multispectral and hyperspectral image using the model of radiance signatures and the real-time sensor and environment information. This detection in the radiance domain is implemented with a sparsity-driven target recognition algorithm according to a set of parameters, to result in optimized known target detection results.

An embodiment of the present invention is to incorporate a model based real-time radiance signature generation subsystem that incorporates mission information. Specifically, a set of known target radiance signatures is generated in real-time based on factors such as sensor geometry, illumination, flying altitude, and weather conditions at the target location. A model based transformation is performed to quickly transform the known target reflectance signatures to the radiance domain. Compared to most conventional approaches, this present invention is fast and allows onboard processing of sensor data in real-time.

Another embodiment of the present invention is to include an on-board automatic target recognition (ATR) module with a sparsity driven technique, which has been used by the inventors in face recognition. The key advantage of the algorithm is its high accuracy.

Another embodiment of the present invention is to include an ATR performance optimization using deep neural networks (DNN). In the case of mine detection in coastal regions, ATR performance can be iteratively improved with the help of known sand and water locations, which are abundant in coastal images. The DNN architecture is used to extract the relationship between ATR performance and the ATR parameters using the known sand and water data and the imagery data. This optimization can also be performed in post-mission analysis.

Another embodiment of the present invention is to incorporate an accurate anomaly detection algorithm to help detect new targets in the scene. New targets can be found by subtracting the set of known targets from the set of anomalies.

Another embodiment of the present invention is to allow users to interact with the target detection results through a user friendly graphical user interface.

Another embodiment of the present invention is to provide a method and system that can perform accurate search and rescue operations. The invention uses a manned or unmanned aircraft, a multispectral or hyperspectral imager, and an onboard PC. One application is to accurately detect mines and obstacles in minefield using multispectral or hyperspectral images in coastal areas. Another potential application is to search and rescue missing aircraft or missing persons in mountain climbing accidents.

DETAILED DESCRIPTION OF THE INVENTION

Figure 1:
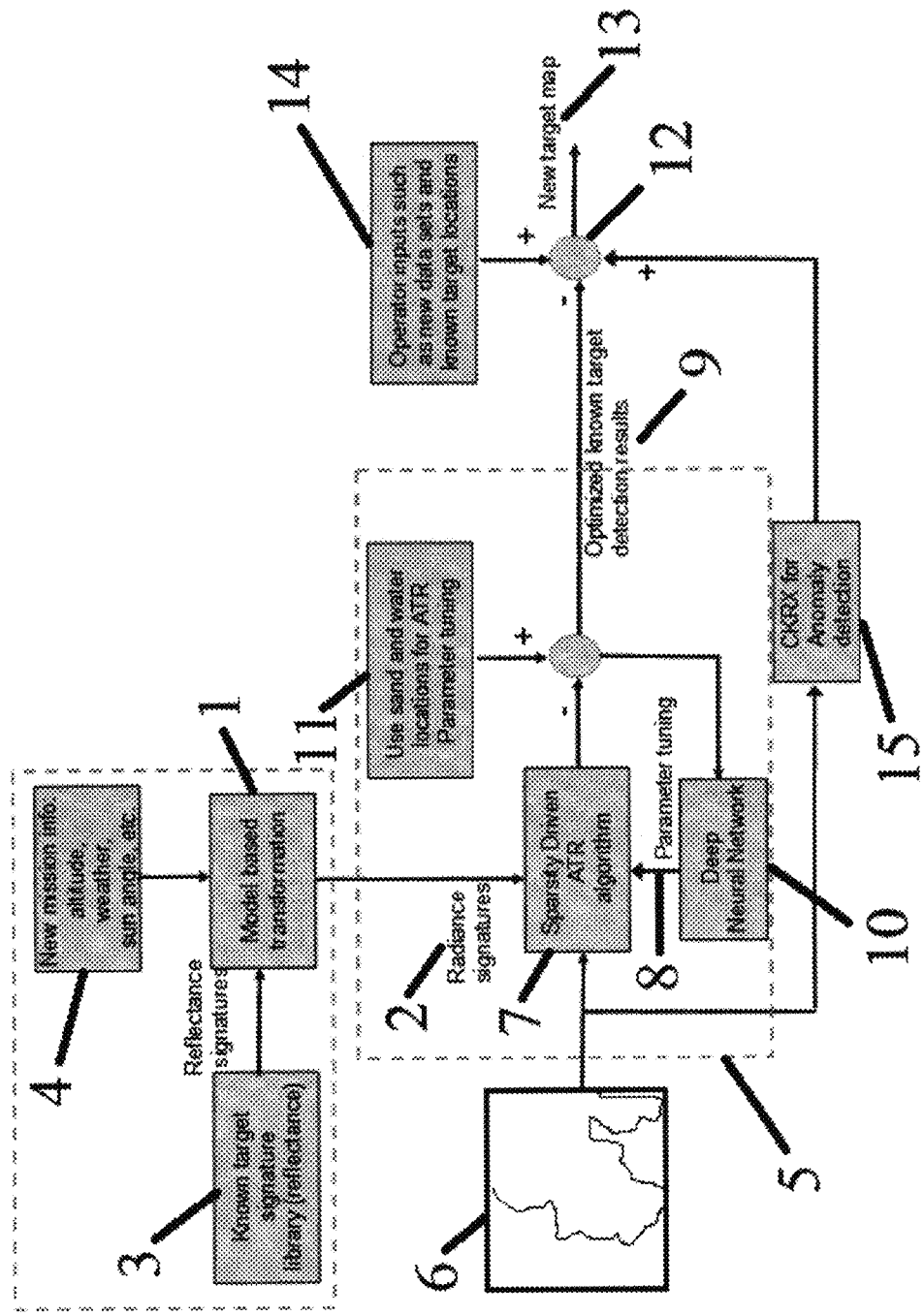
FIG. 1 is a signal flow chart of the present invention in coastal region search operations.

FIG. 1 illustrates the present invention for target detection using a multispectral or hyperspectral image. The automatic target recognition apparatus of the invention comprises a radiance signature generator 1, configured to generate radiance signatures 2 from reflectance signatures 3, according to sensor and environment information 4. The automatic target recognition apparatus also comprises a detection system 5, receiving the radiance signatures 2 and a multispectral or hyperspectral image 6. The detection system 5 comprises a detector 7 implementing a sparsity-driven target recognition algorithm on the multispectral or hyperspectral image 6 according to the radiance signatures 2 and a set of parameters 8 to detect targets in the multispectral or hyperspectral image 6, so that the detection system 5 outputs optimized known target detection results 9.

In an embodiment, the detection system 5 further comprises a deep neural network 10 configured to iteratively tune the set of parameters 8 based on a set of known targets 11 within said multispectral or hyperspectral image 6.

In an embodiment, the automatic target recognition apparatus further comprises a processing circuit 12, configured to receive the optimized known target detection results 9 and output a new target map 13 corresponding to the optimized known target detection results 9. In a further embodiment, the automatic target recognition apparatus further comprises an input system 14, configured to receive operator inputs and generate operator data, wherein the processing circuit 12 receives said operator data and outputs the new target map 13 according to said operator data. In a further embodiment, the automatic target recognition apparatus further comprises an anomaly detection system 15, configured to perform cluster kernel Reed-Xiaoli algorithm on the multispectral or hyperspectral image 6 and output a set of anomalies to the processing circuit 12, wherein the processing circuit 12 receives this set of anomalies and outputs the new target map 13 according to the set of anomalies Given a new multispectral or hyperspectral image 6, the system first obtains the sensor geometry, viewing angle, illumination, and atmospheric information at the target location, and passes the information to the radiance signature generator 1. The radiance signature generator 1 generates an at-sensor target radiance signature for the new image 6. In the radiance signature generator 1, the at-sensor radiance signature is computed in real-time using a target reflectance signature collected from a historical database. All illumination effects, weather information, flying altitude, and other factors known to affect at-sensor radiance from a given surface reflectance are incorporated in the radiance signature generator 1. A model-based transformation is adopted in the radiance signature generator 1, after which automatic target detection begins by using a novel sparsity based ATR algorithm. Unlike conventional ATR which works in the reflectance domain where atmospheric compensation is applied to every pixel in the raw multispectral or hyperspectral image 6, the radiance signature generator 1 of the present inventions enables the ATR algorithm to work directly in the radiance domain.

The current invention further provides a robust algorithm which can also handle errors due to imperfect atmospheric compensation. The ATR algorithm parameters 8 are optimized based on known information such as water and sand locations with the multi- or hyper-spectral image 6 using the deep neural network 10. In other words, the current invention uses the known sand and water locations in the multispectral or hyperspectral image 6 to calibrate and fine tune the ATR algorithm parameters. After several iterations, the probability of detection (Pd) and false alarm rate (FAR) in the ATR improve based upon the ATR algorithm parameters 8 selected by the deep neural network 10.

During post-mission optimization, human operators can provide new training data sets and can also look at the ATR target detection map and quickly point out the locations of beach, water, grass, trees, etc. The deep neural network 10 is utilized at this step due to its significantly better performance over non-deep neural networks. Finally, the current invention optionally applies the novel anomaly detector 15 to locate anomalies in the multispectral or hyperspectral image 6. New targets can be located by comparing the known target map and the anomaly detection map. A graphical user interface allows human operators to add or modify target locations via a user friendly interface.

Sparse representation-based classification relies on the assumption that a test signal approximately lies in the low dimensional subspace spanned by training samples in the same signal class. A test sample y can thus be represented by the linear combination of only a few samples from the training dictionary (or equivalently, basis matrix) A as:

$$y = A_1 x_1 + A_2 x_2 + \ldots + A_M x_M = \underbrace{[A_1 \; A_2 \; \ldots \; A_M]}_{A} \underbrace{\begin{bmatrix} x_1 \\ x_2 \\ \vdots \\ x_M \end{bmatrix}}_{x} = Ax \quad (1)$$

where $A_m$'s are the class-specific training sub-dictionaries and $x_m$'s are corresponding coefficient vectors. The sparse vector x is recovered by solving a constrained optimization problem $$\hat{x} = \arg\min_{x} \|x\|_0 \; \text{s.t.} \; \|y - Ax\|_2 < \varepsilon \quad (2)$$

The problem in (2) can be solved by greedy pursuit algorithms, or relaxed to a convex $l_1$-norm minimization if the solution is sufficiently sparse. The identity of the test sample is then determined to be the class yielding the minimal approximation error:

$$\text{Class}(y) = \arg\min_{m=1,2,\ldots,M} \|y - A_m \hat{x}_m\|_2 \quad (3)$$

Figure 2:
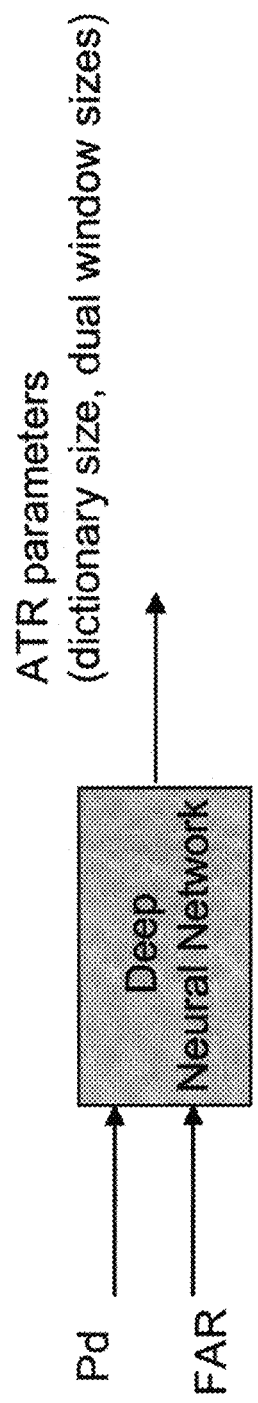
FIG. 2 shows the relationship between ATR performance metrics and ATR parameters as provided by the current invention.
Figure 3:
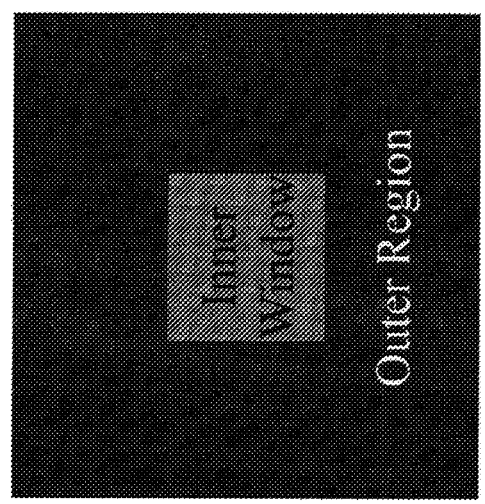
FIG. 3 shows a dual window to locally search for targets in a multispectral or hyperspectral image.
Figure 4:
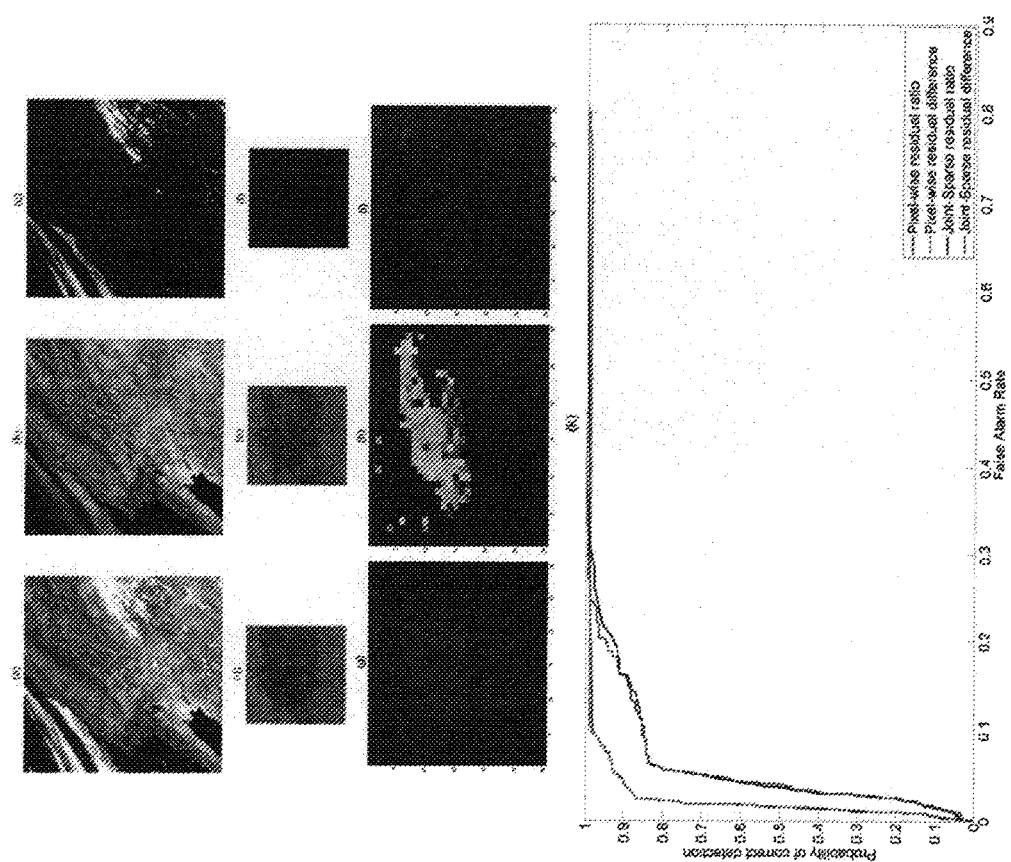
FIG. 4 shows burn scar detection results.

The current invention employs the deep neural network 10 to further improve the ATR performance. As shown in FIG. 2, inputs to the Deep Neural Network (DNN) include the ATR performance metrics (Pd and FAR) and the outputs are the ATR parameters 8 such as dictionary size M as shown in the equation (1) above and dual window sizes as shown in FIG. 3. In the dual window, the outer region contains pixels that will be used to build a statistical model for the background, and is referred to as the outer background window. The inner window, referred to as the inner target window, serves as a buffer and will not be used for generating the background model. The sizes of outer background and inner target windows will affect target detection performance. In principle, a larger outer background window will generate a more accurate background model; a small inner target window will have inferior performance. The two window sizes are initialized based on empirical studies and optimized by the DNN. To capture the relationship between inputs and outputs of ATR, an ATR model is needed, whose inputs are ATR parameters 8 and the outputs are the Pd and FAR. Pd and FAR can be computed by using known sand and water locations, which are readily available in input images. For example, known sand and water locations are used as calibration data. The model is run quickly while the ATR parameters 8 are varied to obtain corresponding Pd and FAR parameters. After running the ATR models many times, the resulting data is used to train the DNN using the configuration shown in FIG. 2.

The DNN has the following advantages:
Better capture of hierarchical feature representations
Ability to learn more complex behaviors
Better performance than that of conventional methods Distributed representations that learn the interactions of many different factors on different levels Programmed to learn from unlabeled data such as using the restricted Boltzmann machine (RBM) pretraining method Performance can scale up with the number of hidden layers and hidden nodes on fast graphical processor units (GPUs)

The sparse representation-based classification method in current invention was applied to some Moderate Resolution Imaging Spectroradiometer (MODIS) images for burnt area detection. MODIS is a multispectral imager developed by NASA. Several processing results are shown in the figures discussed below, including a pre-processing step to remove cloud interference using robust principal component analysis (RPCA). It can be seen that the current invention is able to perform quite accurate burnt area detection. For comparison purposes, a pixel based detection result is also included.

FIG. 3 shows the burn scar detection results for frame A2009252 (almost no cloud): (a) Original MODIS image in RGB mode; (b) Output low-rank component of RPCA; (c) Output sparse component of RPCA (cloud); (d) (e) and (f) Zoom-in patches of multispectral images within the burn scar testing region (red-rectangle region) shown in (a), (b) and (c), respectively; (g) ground truth burn map within the testing patch; (h) Output residual difference of joint-sparsity detection; (i) Output burn scar detection (by thresholding (h)); the receiver operating characteristic (ROC) curves of pixel-wise and joint-sparsity target detections.

Spectral radiance is calculated with the equation shown in (4):

$$L = \frac{A\rho}{1-\rho_A S} + \frac{B\rho_A}{1-\rho_A S} + P - \alpha D\rho \quad (4)$$

In (2), $\rho$ is the material reflectance, $\rho_A$ is the adjacent region reflectance, S is the spherical albedo, A and B are coefficients that depend on atmospheric, geometric and solar illumination conditions; P is the path radiance, D gives the radiance that is due to direct solar illumination which reflects from the target, and $\alpha$ is the amount of solar occlusion.

In order to compute L, for a given material reflectance value, one needs to estimate the parameters, A, B, S, D, and P. These five radiance equation model parameters are computed as follows. The MODTRAN software is run two times with two different reflectance values, $\rho$=0.05 and $\rho$=0.6 for an identified set of time of day, solar illumination and geometric location conditions. The model parameter, D, can be extracted from one of the MODTRAN runs' results since it is equal to MODTRAN's output: "DRCT_REFL" divided by the material reflectance. Suppose $G_\rho$ is the MODTRAN's output "GRND_RFLT" for the constant reflectance of $\rho$, and suppose $C_\rho$ is the MODTRAN's output "SOL_SCAT" for $\rho$. The following relations can then be formed between the outputs of MODTRAN and the model parameters in (4):

$$G_{\rho 1} = \frac{A\rho_1}{1-\rho_1 S}, C_{\rho 1} = \frac{B\rho_1}{1-\rho_1 S} + P \quad (5)$$

$$G_{\rho 2} = \frac{A\rho_2}{1-\rho_2 S}, C_{\rho 2} = \frac{B\rho_2}{1-\rho_2 S} + P$$

Using the expressions in (5), the model parameters S, A, P and B can be found as follows:

$$S = \frac{G_{\rho 2}/\rho_2 - G_{\rho 1}/\rho_1}{G_{\rho 2} - G_{\rho 1}} \quad (6)$$

$$A = \frac{G_{\rho 2}}{\rho_2} - G_{\rho 2} S \quad (7)$$

$$P = \frac{S(C_{\rho 1} - C_{\rho 2}) + C_{\rho 2}/\rho_2 - C_{\rho 1}/\rho_1}{1/\rho_2 - 1/\rho_1} \quad (6)$$

$$B = (C_{\rho 1} - P)\left(\frac{1}{\rho_1} - S\right) \quad (8)$$

Figure 5:
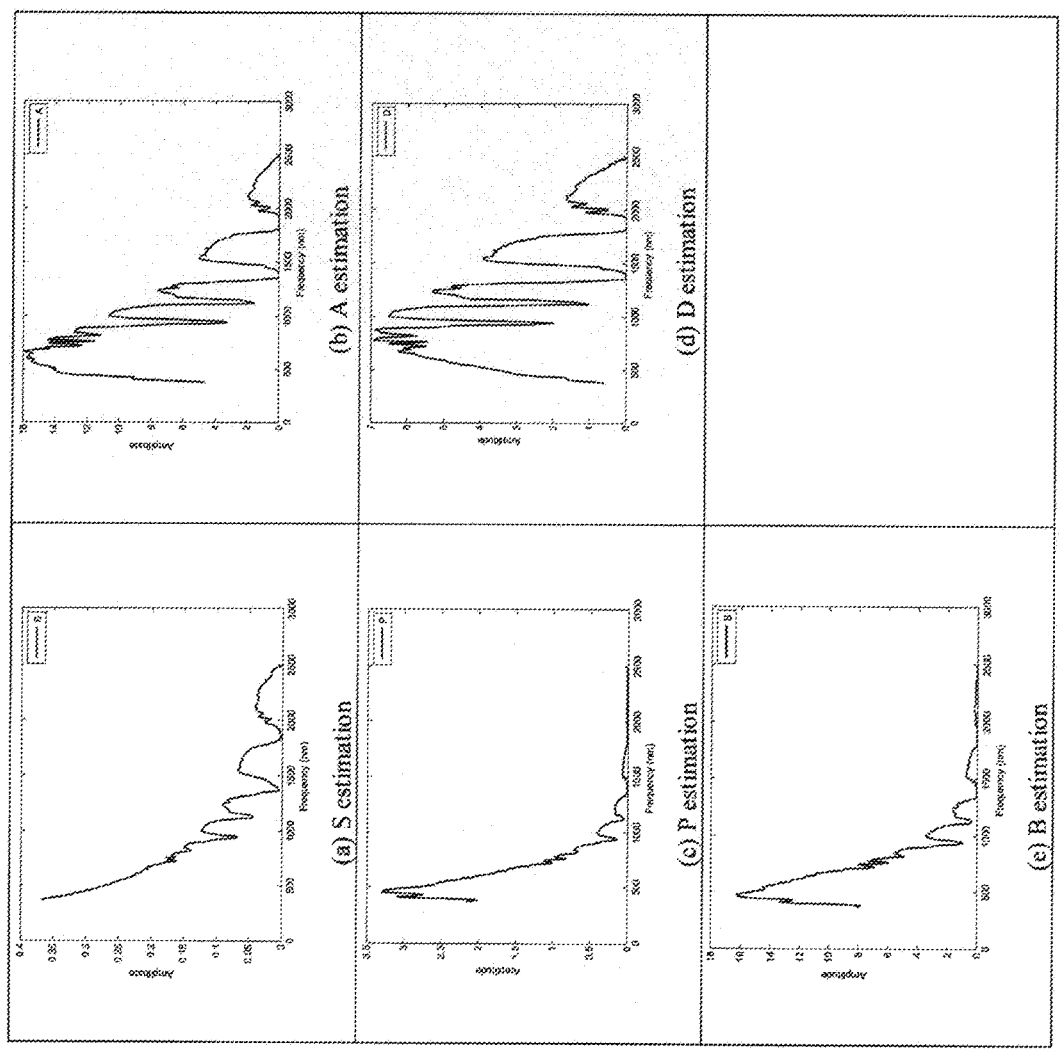
FIG. 5 shows plots of the estimated model parameters.

Two MODTRAN runs have been conducted separately with each of the two constant reflectance values and with the identified atmospheric, solar illumination and geometric location parameters. Using the MODTRAN outputs' results ("DRCT_REFL", "GRND_RFLT", "SOL_SCAT") and the above mathematical equations, the five parameters of the radiance model (A, B, S, D, and P) have been determined at the wavelengths of interest. The estimated model parameters' plots are shown in FIG. 5.

Figure 6:
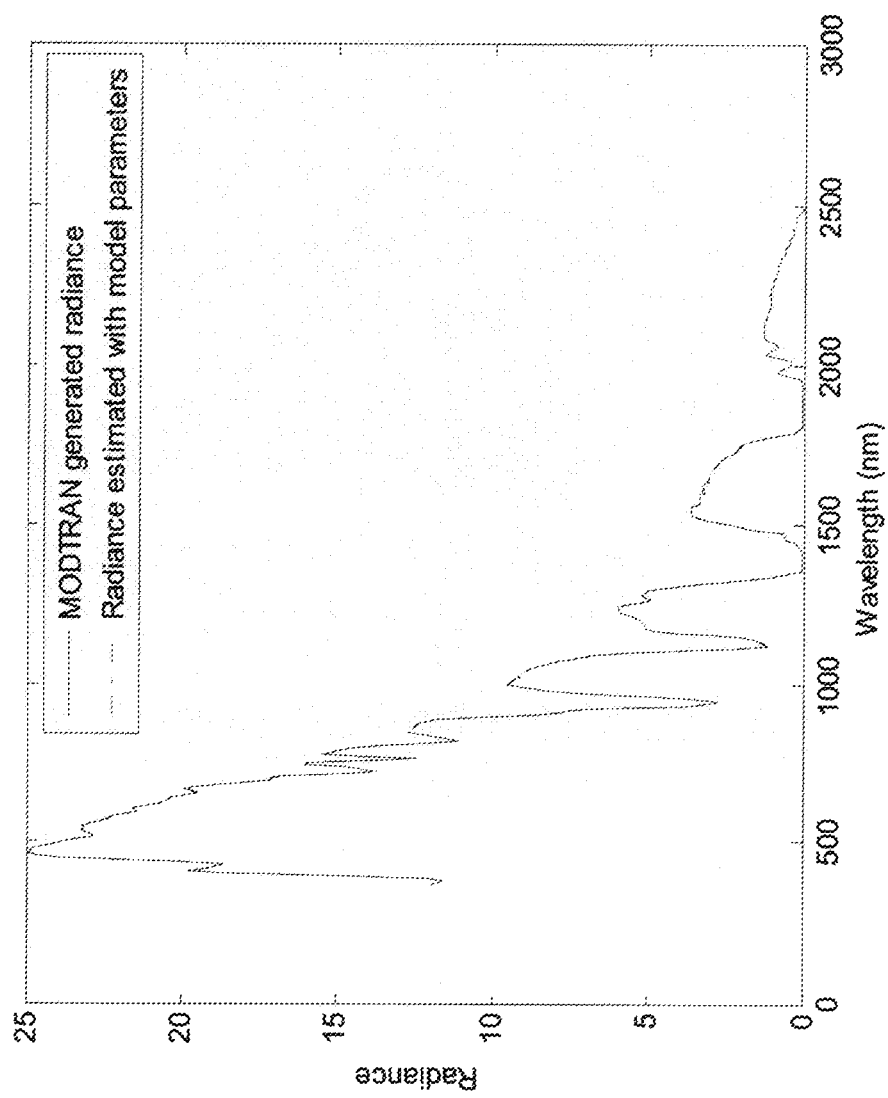
FIG. 6 shows plots of the radiance values of a first case as illustrated by the current invention.

With these estimated model parameters, two analysis cases have then been considered:

FIG. 6 shows the comparison of the MODTRAN-computed radiance values and the radiance values computed by the estimated five model parameters. In this case, it is assumed that the reflectance value is constant at 0.6 for the wavelengths of interest (from 373 nm to 2501 nm). As seen in FIG. 6, the results are almost the same.

Figure 7:
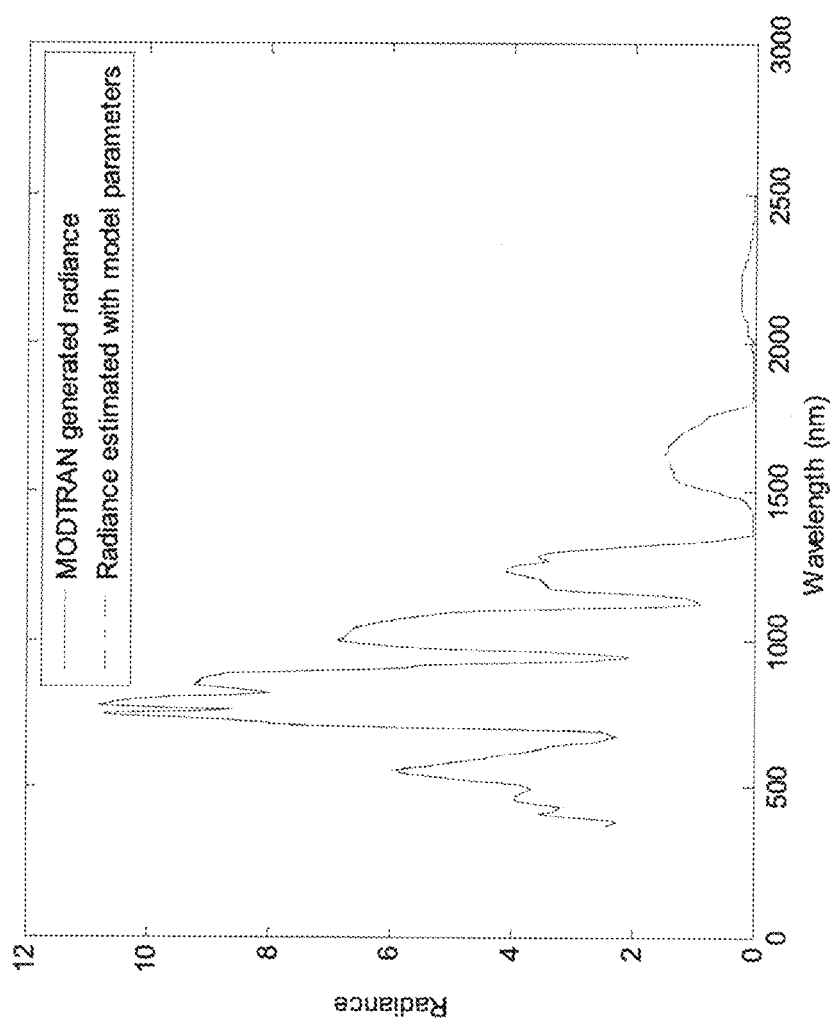
FIG. 7 shows plots of the radiance values of a second case as illustrated by the current invention.

FIG. 7 shows the comparison of the MODTRAN-computed radiance values and the radiance values as computed by the estimated five model parameters. In this case, a lab reflectance signature of green tree coverage is used for the wavelengths (from 373 nm to 2501 nm). MODTRAN is run using the same atmosphere/solar/location conditions and the radiance values are retrieved with MODTRAN with respect to the green tree reflectance signature. Afterwards, the radiance values are computed using the five estimated model parameters and the green tree lab reflectance values for the wavelengths of interest (from 373 nm to 2501 nm). Similar to the results seen in FIG. 6, the results (MODTRAN vs model estimations) are very close to each other, indicating that the applied radiance model parameter estimation successfully estimates the model parameters that MODTRAN runs in the background but does not provide as output.

The current invention employs a DNN technique known as Deep Belief Network (DBN) for target classification in hyperspectral data. The hyperspectral data/image in this example is called "NASA-KSC" image. The image corresponds to the mixed vegetation site over Kennedy Space Center (KSC), Florida. The image data was acquired by the National Aeronautics and Space Administration (NASA) Airborne Visible/Infrared Imaging Spectrometer (AVIRIS) instrument, on Mar. 23, 1996. AVIRIS acquires data in a range of 224 bands with wavelengths ranging from 0.4 μm to 2.5 μm. The KSC data has a spatial resolution of 18 m. Excluding water absorption and low signal-to noise ratio (SNR) bands, there are 176 spectral bands for classification. In the NASA-KSC image, there are 13 different land-cover classes available. It should be noted that only a small portion of the image has been tagged with the ground truth information and these pixels with the tagged ground truth information have been used in the classification study.

For the benchmark techniques, SVM (Support Vector Machine) and SAM (Spectral Angle Mapper) are applied. In SVM, LIBSVM toolbox is used with a kernel type of Radial Basis Function and automatically regularized support vector classification SVM method type (nu-SVC). In addition to using spectral information, local spatial information is extracted for each pixel (RGB bands of a local window of size 7×7) and transformed this information in to a vector and added to the end of the spectral information. The correct classification rates for the test data set are shown in Table 1. It can be seen that DBN and SVM results are very close to each other and both perform significantly better than SAM.

TABLE 1

Classification performance for NASA-KSC

| | Input data type | Test set (correct classification rate) |
|---|---|---|
| SAM | Spectral | 0.7847 |
| SVM | Spectral | 0.9340 |
| DBN | Spectral | 0.9389 |
| SVM | Spectral + Spatial | 0.9709 |
| DBN | Spectral + Spatial | 0.9631 |

The current invention employs cluster kernel RX (CKRX) algorithm. The algorithm is based on of Kernel RX, which is a generalization of the Reed-Xiaoli (RX) algorithm. For instance, when the kernel distance function is defined as the dot product of two vectors, kernel RX is the same as RX. Its advantage lies in its flexibility over RX; however, it is significantly slower than RX. The CKRX is a generalization of kernel RX, i.e. CKRX is reduced to kernel RX under some particular settings.
The CKRX algorithm is below:

---
Algorithm CKRX

Input: Background $X_b = [x_1, x_2, \ldots, x_M]$, a testing pixel r
Output: The anomaly value v
Algorithm:
1. Perform clustering on $X_b$ and get a set of clusters C = $\{(z_1, s_1), (z_2, s_2), \ldots, (z_m, s_m)\}$ where $z_i$ and $s_i$ are center and size of $i^{th}$ cluster.
2. Set v = WKRX (C, r).

---

WKRX is the weighted KRX algorithm:

---
Algorithm WKRX

Input: Weighted points C = $\{(z_1, s_1), (z_2, s_2), \ldots, (z_m, s_m)\}$, a testing point r
Output: The anomaly value v
Algorithm:
1. Construct kernel matrix K, where $K_{ij} = k(x_i, x_j)$ and k is the kernel function. A commonly used kernel is the Gaussian radial basis function (RBF) kernel $k(x,y) = \exp((-\|x - y\|^2)/c)$
2. Set $\hat{\mu}_b = \mu = Kw$ where $w_i = s_i / \sum_{i=1}^{m} s_i$
3. Set $\hat{K} = K - \mu e^T - e\mu^T + ew^T \mu e^T$ where $e_i = 1$ is an m × 1 matrix.
4. Perform eigen-decomposition. $\hat{K}SV = VD$ where S is a diagonal matrix with $S_{ii} = s_i$.
5. Cut D and V to a length of t. $\overline{D} = D(1:t, 1:t), \overline{V} = V(:, 1:t)$ where $D(t+1, t+1) < D(1,1) \times 10^{-8}$
6. Set $\overline{\mu} = \mu - ew^T \mu$

---

---
Algorithm WKRX

7. Set $\overline{\gamma} = \gamma - ew^T \gamma$ where $\gamma_i = k(x_i, r)$
8. Set $v = \|\overline{D}^{-1} \overline{V}^T (\overline{\gamma} - \overline{\mu})\|_2$.

---

Figure 8:
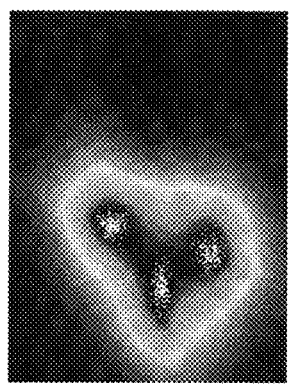
FIG. 8 shows results of different algorithms.
Figure 8:
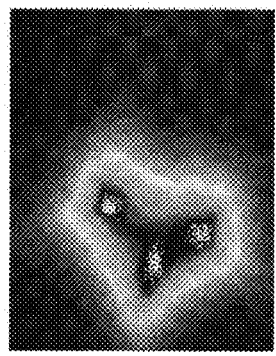
Figure 8:
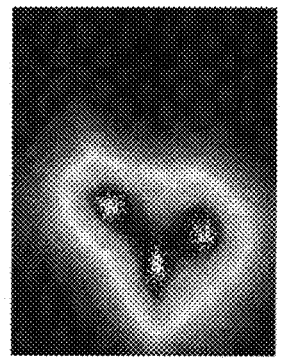

FIG. 8 shows the result of different algorithms, (a) shows the result of KRX using all data points, (b) shows the results using 50 points, and (c) shows the results using 50 clusters. The data model is a mixture of Gaussian functions and there are 1000 data points. The kernel is a Gaussian kernel. The color in the image corresponds to the log of the anomaly value. The results using KRX, KRX with sub-sampling, and CKRX are shown in (a), (b) and (c) respectively.

The number of the original data points is 1000 and the data point number in both sub-sampled KRX and CKRX is 50. From the image, we can observe that the CKRX provides better approximation than sub-sampled KRX. We also compared the speed of these three algorithms and the result is shown in Table 2. The eigen-decomposition of the kernel matrix in CKRX is about 1/2000 of that in original KRX, which is a huge speed improvement.

TABLE 2

Comparison of the speed of KRX, KRX with sub-sampling and CKRX.

| | Algorithm | | |
|---|---|---|---|
| Time (s) | KRX (1000 points) | KRX (50 points) | CKRX (50 clusters) |
| Construct Kernel | 0.1590 | 0.0038 | 0.0030 |
| Eigen Decomposition | 4.6511 | 0.0018 | 0.0023 |
| Image Anomaly | 6.82 | 0.62 | 0.61 |

Figure 9:
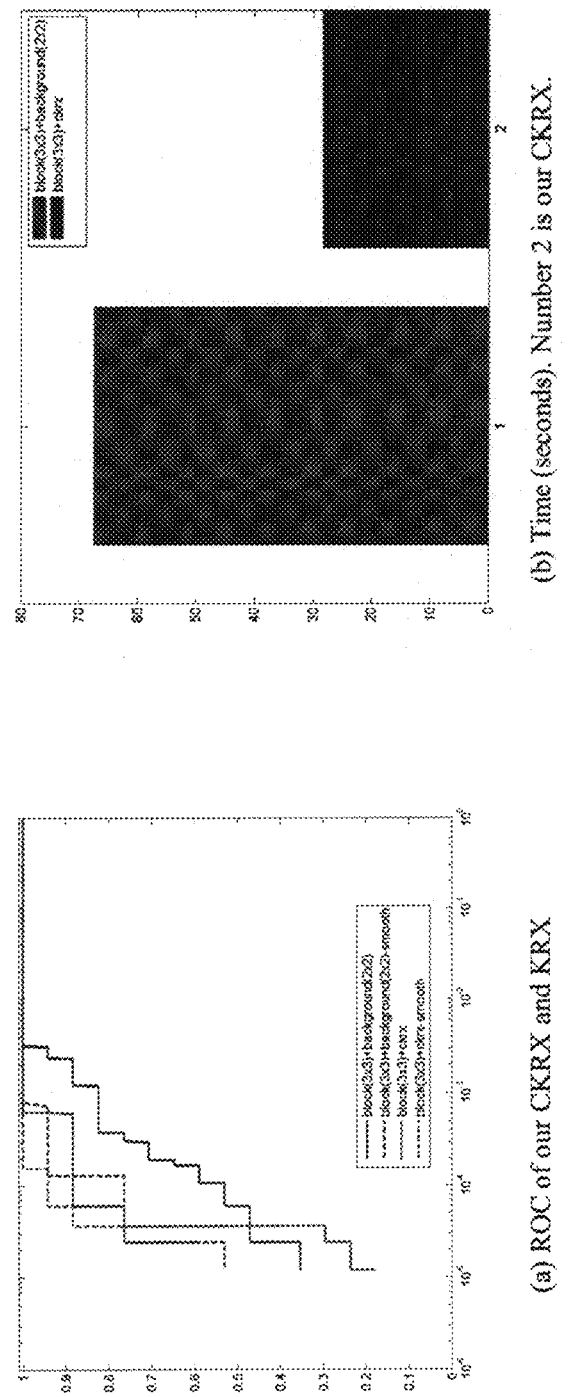
FIG. 9 shows the comparison of kernel RX with background subsampling (2×2) options and CKRX.

Another experiment was to use the Air Force hyperspectral image with PCA transformation and only 10 bands are kept. FIG. 9 shows the comparison of kernel RX with background sub-sampling (2×2), and CKRX. FIG. 9 shows the comparison of kernel RX with background subsampling (2×2) options and CKRX. The performance CKRX is better than KRX, but the speed improvement factor is more than 2 times.

As shown in the disclosure and examples above, the invention provides an ATR system that improves upon the time-consuming aspects of conventional ATR to enable real-time target detection.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. An automatic target recognition apparatus, comprising:
   a radiance signature generator, configured to generate radiance signatures from reflectance signatures, according to sensor and environment information; and a detection system, receiving said radiance signatures and a multispectral or hyperspectral image, said detection system comprising a detector, implementing a sparsity-driven target recognition algorithm on said multispectral or hyperspectral image according to said radiance signatures and a set of parameters to detect targets in said multispectral or hyperspectral image, wherein said detection system outputs optimized known target detection results;

wherein said multispectral or hyperspectral image comprises electromagnetic image data produced in a two dimensional array by a multispectral or hyperspectral imager.

2. The automatic target recognition apparatus of claim 1, wherein said radiance signatures are determined according to the equation:

$$L = \frac{A\rho}{(1-\rho_A S)} + \frac{B\rho_A}{1-\rho_A S} + P - \alpha D\rho$$

wherein L is the radiance, $\rho$ is the material reflectance, $\rho_A$ is the adjacent region reflectance, S is the spherical albedo, A and B are coefficients dependent upon atmospheric, geometric and solar illumination conditions, P is the path radiance, D is the radiance due to direct solar illumination, and $\alpha$ is the amount of solar occlusion.

3. The automatic target recognition apparatus of claim 1, wherein said set of parameters comprises a dictionary size, an outer background window size, and an inner target window size, and said sparsity-driven target recognition algorithm comprises determining a class of a test sample y as the class with the minimal approximation error determined by the equation:

$$\text{Class}(y) = \operatorname*{argmin}_{m=1,2,\ldots,M} \|y - A_m \hat{x}_m\|_2,$$

wherein $\hat{x}$ is a sparse vector determined by solving a constrained optimization:

$$\hat{x} = \operatorname*{argmin}_x \|x\|_0 \text{ such that } \|y - Ax\|_2 < \varepsilon,$$

and said test sample y is represented by a linear combination of a plurality of training samples corresponding to said dictionary size of a training dictionary A, wherein $$y = A_1 x_1 + A_2 x_2 + \ldots + A_M x_M = [A_1 \ A_2 \ \ldots \ A_M] \begin{bmatrix} x_1 \\ x_2 \\ \vdots \\ x_M \end{bmatrix} = Ax,$$

where $A_{(1\ldots M)}$ are class-specific training sub-dictionaries and $x_{(1\ldots M)}$ are corresponding coefficient vectors.

4. The automatic target recognition apparatus of claim 1, wherein said detection system further comprises a deep neural network, configured to iteratively tune said set of parameters based on a set of known targets within said multispectral or hyperspectral image.

5. The automatic target recognition apparatus of claim 4, wherein said deep neural network is a deep belief network receiving a probability of detection input and a false alarm rate input and outputting said set of parameters.

6. The automatic target recognition apparatus of claim 1, further comprising a processing circuit, configured to receive said optimized known target detection results and output a new target map corresponding to said optimized known target detection results.

7. The automatic target recognition apparatus of claim 6, further comprising an input system, configured to receive operator inputs and generate operator data, wherein said processing circuit receives said operator data and outputs said new target map according to said operator data.

8. The automatic target recognition apparatus of claim 6 further comprising an anomaly detection system, configured to perform cluster kernel Reed-Xiaoli algorithm on said multispectral or hyperspectral image and output a set of anomalies to said processing circuit, wherein said processing circuit receives said set of anomalies and outputs said new target map according to said set of anomalies.

9. A method for real-time target recognition within a multispectral or hyperspectral image, comprising:
generating radiance signatures from reflectance signatures, sensor information and environment information; and
detecting targets in said multispectral or hyperspectral image, comprising:
receiving said radiance signatures and said multispectral or hyperspectral image by a detection system wherein said multispectral or hyperspectral image comprises electromagnetic image data produced in a two dimensional array by a multispectral or hyperspectral imager;
implementing a sparsity-driven target recognition algorithm on said multispectral or hyperspectral image according to said radiance signatures and a set of parameters; and
outputting optimized known target detection results.

10. The method for real-time target recognition within a multispectral or hyperspectral image of claim 9, wherein said radiance signatures are determined according to the equation:

$$L = \frac{A\rho}{(1-\rho_A S)} + \frac{B\rho_A}{1-\rho_A S} + P - \alpha D\rho$$

wherein L is the radiance, $\rho$ is the material reflectance, $\rho_A$ is the adjacent region reflectance, S is the spherical albedo, A and B are coefficients dependent upon atmospheric, geometric and solar illumination conditions, P is the path radiance, D is the radiance due to direct solar illumination, and $\alpha$ is the amount of solar occlusion.

11. The method for real-time target recognition within a multispectral or hyperspectral image of claim 9, wherein said set of parameters comprises a dictionary size, an outer background window size, and an inner target window size, and said sparsity-driven target recognition algorithm comprises determining a class of a test sample y as the class with the minimal approximation error determined by the equation:

$$\text{Class}(y) = \operatorname*{argmin}_{m=1,2,\ldots,M} \|y - A_m \hat{x}_m\|_2,$$

wherein $\hat{x}$ is a sparse vector determined by solving a constrained optimization:

$$\hat{x} = \underset{x}{argmin}\|x\|_0 \text{ such that } \|y - Ax\|_2 < \varepsilon,$$

and said test sample y is represented by a linear combination of a plurality of training samples corresponding to said dictionary size of a training dictionary A, wherein $$y = A_1x_1 + A_2x_2 + \ldots + A_Mx_M = [A_1 \quad A_2 \quad \ldots \quad A_M]\begin{bmatrix} x_1 \\ x_2 \\ \vdots \\ x_M \end{bmatrix} = Ax,$$

where $A_{(1 \ldots M)}$ are class-specific training sub-dictionaries and $x_{(1 \ldots M)}$ are corresponding coefficient vectors.

12. The method for real-time target recognition within a multispectral image of claim 9, wherein said detecting targets in said multispectral or hyperspectral image further comprises iteratively tuning said set of parameters with a deep neural network based on a set of known targets within said multispectral image.

13. The method for real-time target recognition within a multispectral or hyperspectral image of claim 12, wherein said deep neural network is a deep belief network receiving a probability of detection input and a false alarm rate input and outputting said set of parameters.

14. The method for real-time target recognition within a multispectral or hyperspectral image of claim 9, further comprising:
    receiving said optimized known target detection results; and
    outputting a new target map corresponding to said optimized known target detection results.

15. The method for real-time target recognition within a multispectral or hyperspectral image of claim 14, further comprising:
    receiving operator inputs and generating operator data with an input system; and
    outputting said new target map corresponding to said optimized known target detection results and said operator data.

16. The method for real-time target recognition within a multispectral or hyperspectral image of claim 14 further comprising:
    performing a cluster kernel Reed-Xiaoli algorithm on said multispectral or hyperspectral image to identify an anomaly; and
    outputting said new target map corresponding to said optimized known target detection results and said anomaly.

* * * * *